Patented Oct. 8, 1935

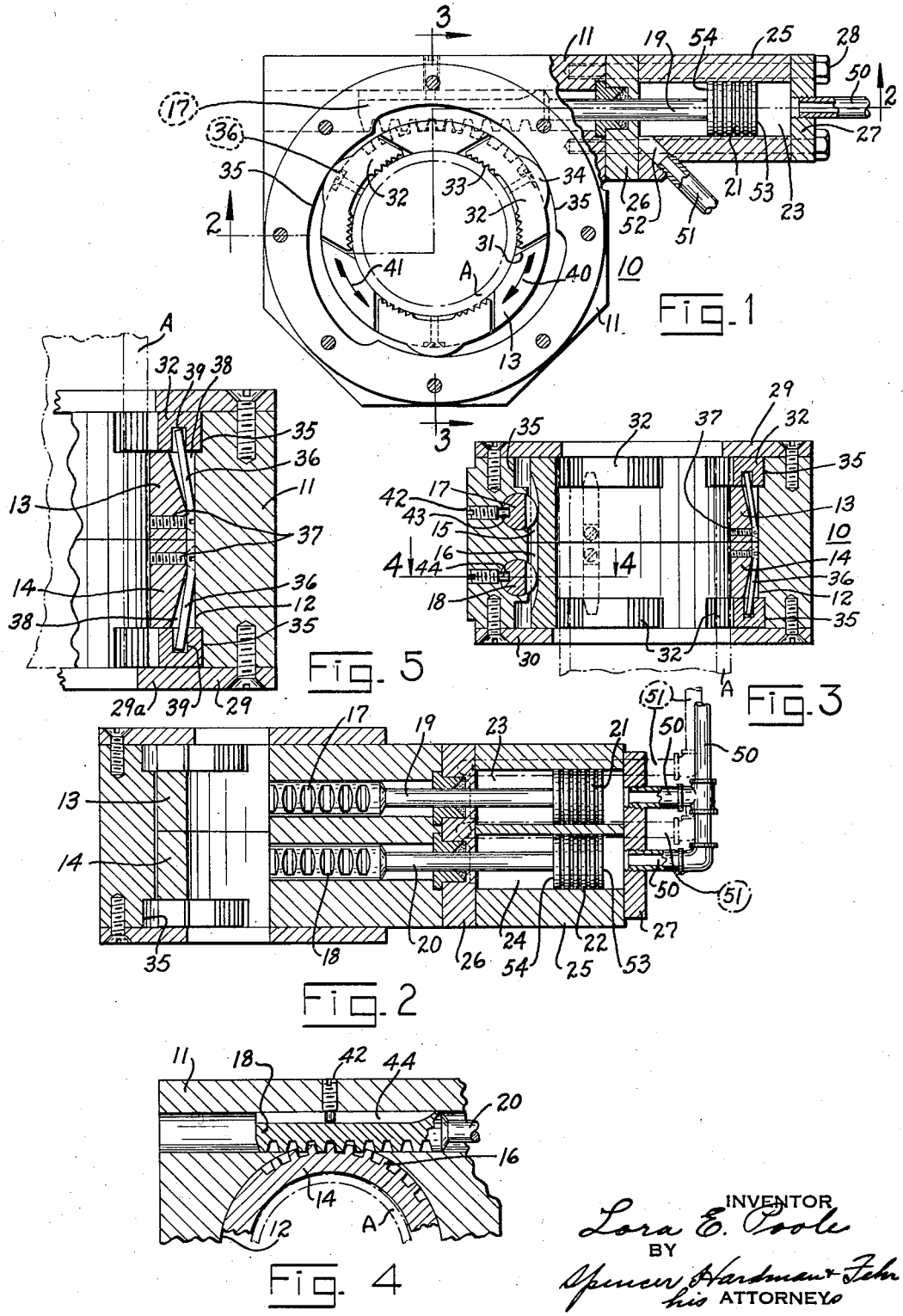

2,016,652

UNITED STATES PATENT OFFICE 2,016,652

CHUCK

Lora E. Poole, Anderson, Ind., assignor, by mesne assignments, to General Motors Corporation, Detroit, Mich., a corporation of Delaware Application December 30, 1932, Serial No. 649,459
Renewed May 28, 1934

11 Claims. (Cl. 279—71)

This invention relates to chucks and more particularly to fluid pressure operated chucks.

It is an object of the present invention to provide certain improvements in chucks.

Another object of the present invention is to provide a chuck actuated by the same fluid pressure and in such manner that more fluid pressure is effective for opening the chuck than is effective for closing the same, whereby abundant reserve power enables the chuck to overcome the considerable static friction between certain parts thereof, which primarily resists the opening of the chuck.

This is a continuation in part of application Serial No. 437,478, filed March 20, 1930.

Further objects and advantages of the present invention will be apparent from the following description, reference being had to the accompanying drawing wherein a preferred embodiment of one form of the present invention is clearly shown.

In the drawing:

Fig. 1 is a plan view of a chuck embodying the present invention, certain parts thereof being shown in section.

Fig. 2 is a sectional view taken along line 2—2 of Fig. 1.

Fig. 3 is a sectional view taken on the line 3—3 of Fig. 1.

Fig. 4 is a fragmentary sectional view taken on the line 4—4 of Fig. 3.

Fig. 5 is an enlarged fragmentary sectional view similar to part of Fig. 3, showing, however, the chuck adopted for different loading thereof.

Referring to Figs. 1 to 4 inclusive, a chuck 10 comprises a frame 11, having a cylindrical bore 12 which receives chuck jaw carrying frames 13 and 14, having cylindrical peripheries in which gear segments 15 and 16 respectively, are cut. These gear segments mesh with racks 17 and 18 respectively, attached by piston rods 19 and 20 respectively, to pistons 21 and 22 respectively, slidable in cylinders 23 and 24 respectively, provided by a cylinder 25, which is clamped between end plates 26 and 27, with screws 28 threaded into frame 11. In order to prevent rotation of the racks 17 and 18 within frame 11, set screws 42 are threaded into frame 11 and received by longitudinal grooves 43 and 44 of the racks 17 and 18, respectively. The chuck jaw frame 13 is confined between the jaw frame 14 and a ring plate 29 whose inside diameter is smaller than the inside diameter of the frames 13 and 14. The chuck jaw frame 14 is confined between the jaw frame 13 and a ring plate 30 whose inside diameter is slightly larger than the inside diameter of the frames 13 and 14. Ring plate 30 is secured in any suitable manner to frame 11. Each of the jaw frames 13, 14 is provided with radial notches 31 each of which guides for radial movement a chuck jaw 32, having teeth 33 for gripping a work piece A and having a projection 34 cooperating with a stationary camming surface 35, provided by the frame 11. The projections 34 are normally urged against the camming surfaces 35 by leaf spring members 36, each attached by screws 37 to one of the chuck jaw frames and each extending through a slot 38 provided in the chuck jaw frame and into a recess 39 provided in the chuck jaw. When the pistons 21 and 22 move toward the right as viewed in Figs. 1 and 2, the frames 13 and 14 will rotate in the direction of the arrow 40, thereby causing the chuck jaw projections 34 to ride along those portions of the camming surfaces 35 which are nearer to the center of the chuck, thereby causing the work piece A to be firmly gripped by the jaws 32. When the pistons 21 and 22 move toward the left as viewed in Figs. 1 and 2, the motion of the chuck frames 13 and 14 will take place in the direction of the arrow 41, thereby causing the chuck jaw projections 34 to ride progressively toward portions of the camming surfaces 35 which are more remote from the center of the chuck, whereupon the jaws will recede from the work piece A to permit the same to descend by gravity into a suitable container or chute (not shown).

Fluid pressure from any suitable supply (not shown) is admitted into cylinders 23 and 24 to one side of pistons 21 and 22 through any suitable conducting means such as pipes 50, and to the opposite side of said pistons through pipes 51 and ducts 52 provided by the cylinder block 25. Any suitable intercepting means such as one or more shiftable valves (not shown) may be provided intermediate pipes 50 and 51 and operated to intercept or provide communication between the fluid pressure supply and the cylinders through either one of pipes 50 or 51 to effect movement of pistons 21 and 22 in any desired direction whereby to cause the chuck to open or close.

The camming surfaces 35 have been so designed that upon movement of the pistons toward the left as viewed in Fig. 1 the chuck will be caused to open and vice versa. Movement of the pistons toward the left is effected by subjecting piston surfaces 53 to fluid pressure. It will be noted from Figs. 1 and 2 that the entire piston surfaces 53 may be subjected to fluid pressure whereas the opposite, fluid pressure subjectable surfaces 54 are smaller due to the merging of piston rods 19 and 20 into these piston surfaces. From this follows that the pistons are moved toward the left under greater force than toward the right as viewed in Fig. 1, whereby more power is applied for causing the chuck to open than is applied for causing the same to close. This is a desirable feature for prior to the actual opening of the chuck, the considerable static friction between the camming surfaces and the chuck jaws has to be overcome first by the pistons 21 and 22.

Fig. 5 discloses the same chuck as the other figures, however plate 29a forms the bottom ring plate so that a work-piece A is introduced from above and rests against said ring plate 29a prior to the actual gripping thereof by the chuck jaws, contrary to the disclosures in Figs. 2 and 3 wherein the operator introduces the workpiece A from below and holds the same against ring plate 29 until the chuck jaws grip the work.

While the form of embodiment of the present invention as herein disclosed, constitutes a preferred form, it is to be understood that other forms might be adopted, all coming within the scope of the claims which follow.

What is claimed is as follows:

1. A chuck comprising a tubular frame providing cams; a ring journaled in the frame and providing recesses; jaws movable within said recesses and cooperating with said camps; ring plates at both ends of the frame for retaining the ring within the frame, the inside diameter of one of said plates being smaller than the inside diameter of the ring thereby serving as a work locator prior to the gripping of the work by the jaws; and means for causing relative rotation between the ring and frame.

2. A chuck comprising, in combination, a tubular frame providing cams; a ring journaled in the frame and providing recesses; jaws movable within said recesses and cooperating with said cams; ring plates at both ends of the frame for retaining the ring within the frame, the inside diameter of one of said plates being smaller than the inside diameter of the ring thereby serving as a work locator prior to the gripping of the work by the jaws; and both plates being interchangeable whereby the work may be introduced into the chuck from either of two sides; and means for causing relative rotation between the frame and ring.

3. A chuck comprising, in combination, a tubular frame providing cams; a ring journaled in the frame and providing recesses open at one end thereof; jaws located within said recesses and cooperating with said cams; ring plates at both ends of the frame for retaining the ring within the frame and the jaws within the recesses of the ring, the inside diameter of one of said plates being smaller than the inside diameter of the ring thereby serving as a work locator prior to the gripping of the work by the jaws; and means for causing relative rotation between the frame and ring.

4. A chuck comprising, in combination, a tubular frame providing cams; a ring journaled in the frame and providing recesses open at one end thereof; jaws located within said recesses and cooperating with said cams; ring plates at both ends of the frame for retaining the ring within the frame and the jaws within the recesses of the ring, the inside diameter of one of said plates being smaller than the inside diameter of the ring thereby serving as a work locator prior to the gripping of the work by the jaws, and both plates being interchangeable whereby the work may be introduced into the chuck from either of two sides; and means for causing relative rotation between the frame and ring.

5. A chuck comprising, in combination, a frame providing cams; a plurality of axially aligned rings in journaled relation with the frame and providing recesses; jaws movable in said recesses and cooperating with said cams; and individual fluid pressure operated means for each ring to rotate the same.

6. A chuck comprising, in combination, a frame providing cams; a plurality of axially aligned rings in journaled relation with the frame and providing recesses; jaws movable in said recesses and cooperating with said cams; individual fluid pressure operated means for each ring to rotate the same in either direction; and a common means for conducting fluid pressure to all fluid pressure operated means to effect rotation of all rings in one direction; and another common means for conducting fluid pressure to all fluid pressure operated means to effect rotation of all rings in the opposite direction.

7. A chuck comprising, in combination, a frame providing cams; a plurality of axially aligned rings in journaled relation with the frame and providing recesses; jaws movable in said recesses and cooperating with said cams; and means for each ring including a cylinder and piston to rotate the ring.

8. A chuck comprising, in combination, a frame providing cams; a plurality of axially aligned rings in journaled relation with the frame, each ring providing recesses and peripheral gear teeth; jaws in said recesses and cooperating with said cams to move the jaws relative to the recesses upon rotation of the rings relative to the frame; an integral block secured to the frame and providing a cylinder for each ring; a piston in each cylinder, each piston terminating in a rack longitudinally slidably supported by the frame and meshing with the teeth of a ring; and a single conduit for conducting fluid under pressure to all cylinders.

9. A chuck comprising, in combination, a frame providing cams; a plurality of axially aligned rings in journaled relation with the frame, each ring providing recesses and peripheral gear teeth; jaws in said recesses and cooperating with said cams to move the jaws relative to the recesses upon rotation of the rings relative to the frame; an integral block secured to the frame and providing a cylinder for each ring; a piston in each cylinder, each piston terminating in a rack longitudinally slidably supported by the frame and meshing with the teeth of a ring; a single conduit for conducting fluid under pressure to one side of all cylinders; and another single conduit for conducting fluid under pressure to the other side of all cylinders.

10. A chuck comprising, in combination, a tubular frame providing internal cams; a ring rotatable within the frame and providing recesses open at one end thereof and longitudinal grooves in the periphery thereof, a normal part of the groove bottoms extending parallel to the ring axis and terminating into bottom parts of the grooves which are tapered in such manner that the groove portions adjacent said one end of the ring are deepest; jaws movable within said recesses radially of the ring axis and cooperating with said cams, said jaws being also provided with grooves in those surfaces which seat against the bottoms of the recesses; leaf springs located in the ring grooves and attached at one end to the normal bottom parts thereof, the other end of said leaf springs being received in the jaw grooves and the leaf springs being adapted yieldingly to maintain the jaws in engagement with the cams; and means for retaining the ring within the frame and the jaws within the recesses of the rings.

11. A chuck comprising, in combination, a frame member providing cams; another member providing recesses, one of said members being journaled on the other member; jaws movable within said recesses and cooperating with said cams; plates at the ends of both members for preventing longitudinal movement of either member relative to the other member, one of said plates having a larger area than the other plate whereby the excess area of said one plate serves as a work locator prior to the gripping of the work by the jaws; and means for causing relative rotation between both members.

LORA E. POOLE.